April 9, 1968   M. TIBORCZ   3,376,912
TIRE TREAD FOR SPECIAL USE TIRE
Filed Feb. 28, 1966   2 Sheets-Sheet 1

INVENTOR.
MICHAEL TIBORCZ
BY Louis Candela
ATTORNEY

April 9, 1968   M. TIBORCZ   3,376,912
TIRE TREAD FOR SPECIAL USE TIRE
Filed Feb. 28, 1966   2 Sheets-Sheet 2

INVENTOR.
MICHAEL TIBORCZ
BY
ATTORNEY

United States Patent Office 3,376,912
Patented Apr. 9, 1968

3,376,912
TIRE TREAD FOR SPECIAL USE TIRE
Michael Tiborcz, 714 W. Market St.,
Akron, Ohio 44303
Filed Feb. 28, 1966, Ser. No. 530,584
5 Claims. (Cl. 152—209)

ABSTRACT OF THE DISCLOSURE

A pneumatic tire with a road contacting tread surface characterized in a series of clusters of protrusions and depressions arranged circumferentially of the tire. The protrusions being characterized by having reduced angular relationships to the direction of travel of the vehicle. The clusters comprising pairs of protrusions having a planar configuration corresponding to a bent U, a planar configuration corresponding to a double Z and a planar configuration that is generally oval.

---

This invention, in general, refers to vehicle tires. More particularly, this invention refers to that portion of the tire known as the tread which, in effect, is the road contact surface of the tire and is primarily responsible for maintaining a vehicle in safe contact to the road or driving surface upon which a vehicle may be traveling.

In infancy, the purpose of a tire was merely to support a load during vehicular movement. When, however, vehicular low speed gave way to demands for increased speed, the purpose of the tire became more important and more complicated. Speed created the pneumatic tire and speed is responsible for the constant and continuing effort to improve the pneumatic tire consistent with the continuing and progressive demand for speed and performance in vehicular operation. To re-phrase, safe high speeds with its accompanying higher forces and stresses is permissible only because of the compatable improvement in tires. Increased speeds and tire improvements have been gradual due to the fact that both factors must be attentive to the influence of the motorist's driving safety, ease, and comfort.

The irregular pattern, or tread design, molded into the road contact surface of a tire is necessary in order to attain a semblance of a mechanical interlock between a vehicle and the surface upon which it is being driven. In fashioning the tread character of a tire, many factors must be considered so that safety is retained during reasonable operation yet be not drastically impaired during periods of emergency or voluntary unreasonable operation.

Intended use; that is, the most common road surface with which a vehicle is likely to come in contact with is a prime consideration. For instance, if the road surface is likely to give or deform under the weight of a vehicle, the tread character is certain to be deep-cleated, with variance in depth and rib spacing being determined by variance in surface which may be graded from merely soft ground to boggy. Special deep-cleating of this nature, however, seems restricted to remote country roads, farms, or undeveloped countries where road network construction has not become a reality.

Most vehicles, however, are intended for use on a road network which, in many instances, will mean super highways. The road surfaces are customarily paved and, hence, the contact of a vehicle is generally upon a smooth driving surface, except when climatic conditions create the hazards of snow and ice. Generally, the winter season will compel many motorists to make a tire change in favor of a tire having a tread character which is more deep-cleated and safer under winter driving conditions.

This tire change over, although dictated by safety, is a source of aggravation to most drivers. There is, of course, an addition to the cost of vehicle operation involved in the change over to "snow tires." Most motorists, however, are willing to pay the price in the interest of safety. The deep-cleated special weather treads, unfortunately, "sing," thump, bump, and are otherwise unsatisfactory on an unaffected smooth driving surface. It is at this point that objections to the use of special weather tires arise because even the special weather tires will likely, for most part, have contact with smooth driving surfaces. This is so since in most areas of heavy vehicular traffic the use of heavy equipment and chemicals has become adept and road clearing is usually a quick procedure. Therefore, even in regions of extended winter season, vehicles will likely have a smooth driving surface on which to operate except for only fractional periods. For this reason, unsatisfactory features are attendant in the necessary use of special weather tires.

It has been found, however, that it is possible to produce a relatively deep-cleated tire which would be safe and serviceable during the brief periods of adverse road condition yet be unobjectionable on a smooth driving surface. This can be accomplished by constructing a tread character in which the patterns are reduced in angular opposition to the direction of travel of a vehicle.

It is the primary object of this invention, therefore, to produce a tread character in a tire which would be a factor of safety under adverse climatic conditions while retaining its ability to provide safe and comfortable vehicle operation on a smooth driving surface.

A further object of this invention is to provide a relatively deep-cleated tread character wherein the necessary irregularity is reduced in angular opposition to the direction of travel of a vehicle.

These and other objects will become readily apparent upon a reading of the following brief specification, considered and interpreted in the light of the accompanying drawings.

Figure 2:
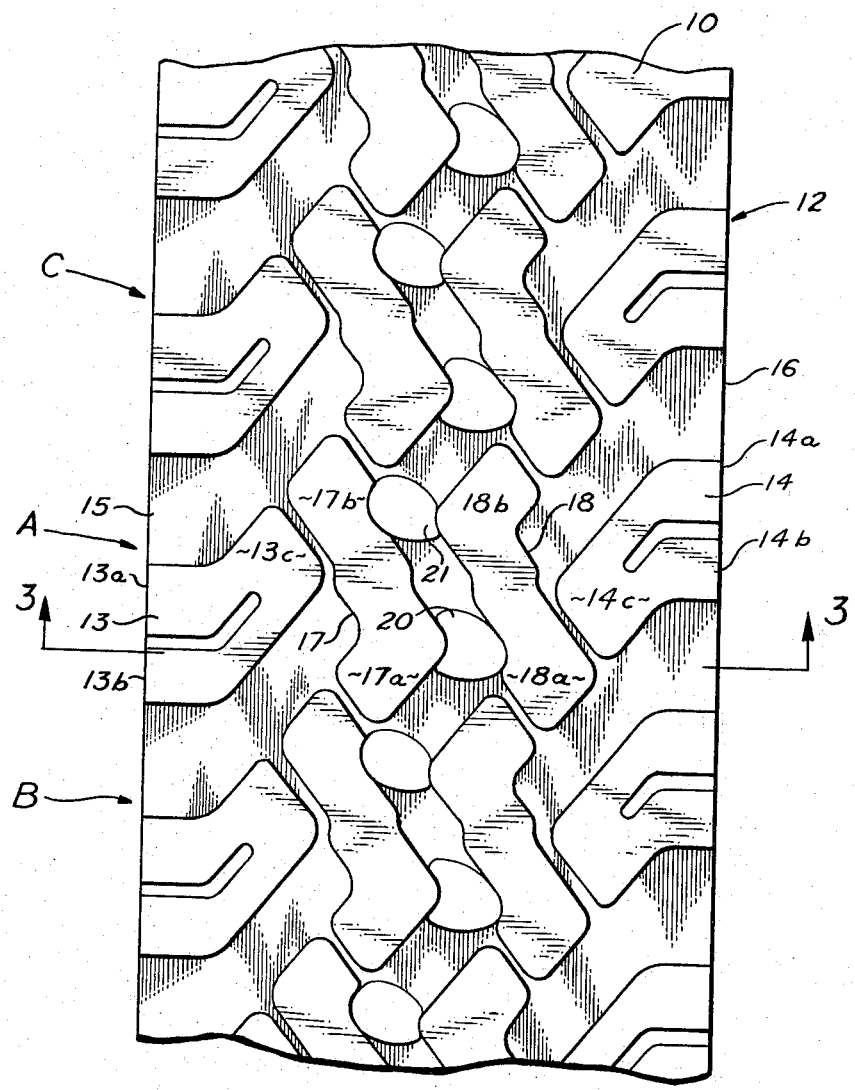
FIGURE 2 is a plan view of a fragmentary portion of the improved tread character.

Referring now to the drawings and particularly to FIGURE 2, it will be seen that the road contact surface 10 is made irregular through means of the tread character, generally indicated by the numeral 12. Numerous edges, ends, and angles will be readily observable as they are made to occur through the novel arrangement of protrusions and associated depressions as will hereinafter become apparent.

The protrusions are varied and not of the same nature although complemental in structure. A bent U protrusion 14 has its arms 14a and 14b opening toward the side wall 16 of the tire and its closed portion 14c bent for angular disposition and arrangement relative to a double Z protrusion 18. Protrusion 18 through use of two noticeable segments 18a and 18b may be said to reverse itself and, hence, avoid the radical angling of an ordinary Z configuration. The segment 18a will be seen to have on one side a close proximity to closed portion 14c of the U protrusion 14 and, on its opposed side, to be in adjacency to an oval protrusion 20. Segment 18b is in adjacency to oval protrusion 21. Both the oval protrusions 20 and 21 are in adjacency to double Z protrusion 17 with protrusion 20 disposed relative to segment 17a and protrusion 21 relative to segment 17b. Segment 17b is in close proximity, on its opposed side, to closed portion 13c of open U protrusion 13 which has its arms 13a and 13b opening toward the side wall 15.

It will be observed that the description in enumeration of elements, thus far, has proceeded transversely from the side wall 16 to the side wall 15 and for the purposes of clarity the elements so enumerated will be regarded as belonging to cluster A. It will be seen, then, that clusters B and C would be identical in transverse description of elements to that given in connection with cluster A. It is to be understood, of course, that successive transverse clusters are circumferentially spaced from each other and are endless.

Referring again to cluster A and to the double Z's 17 and 18, it will be seen that the reverse nature of this particular configuration enables the Z's to be extended longitudinally without abrupt termination relative to the direction of vehicle travel. Furthermore, as will be observed in FIGURE 2, this configuration enables the Z's of clusters A, B, and C to circumferentially "flow" one to the other since all pronounced gaping is eliminated. Gaping in transverse direction is reduced through the unique disposition of the oval protrusions relative to the double Z's as was described in connection with the protrusions 20 and 21 of cluster A. Furthermore, closed portion 14c of the bent U protrusion 14 is bent toward segment 18a which again reduces gaping.

Figure 1:
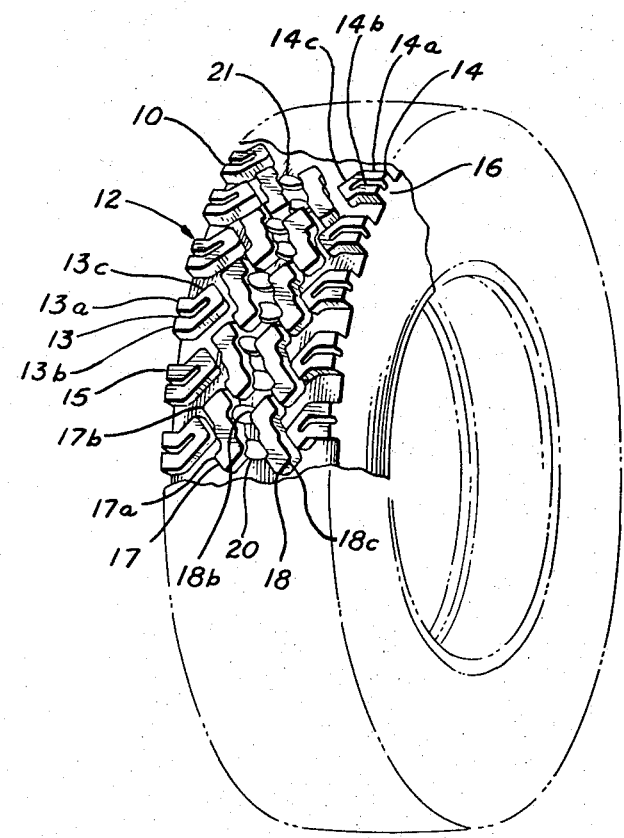
FIGURE 1 is an isometric view of a tire in outline form showing a portion of its improved tread character.
Figure 3:
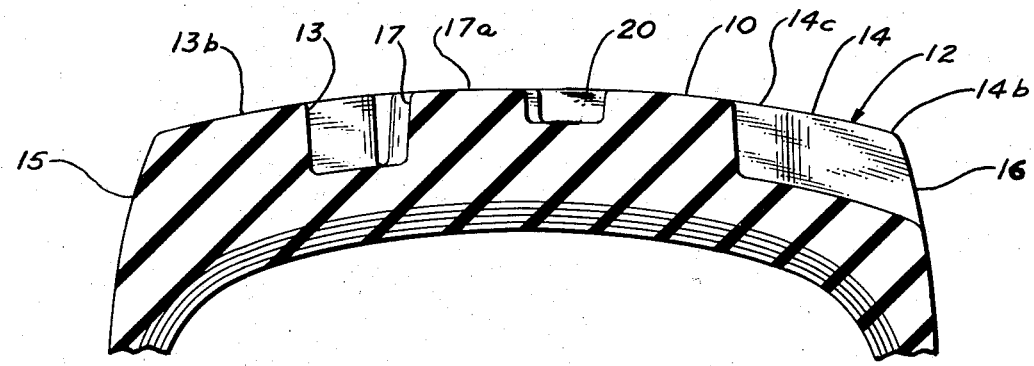
FIGURE 3 is a cross section taken on the line 3—3 of FIGURE 2.

Between the protrusions or wherever there is a separation of the various protrusions, an associated depression occurs. This will be known to those skilled in the art and so it is not considered necessary to encumber this description with numerical indications of each. To be pointed out, however, and as will best be seen in FIGURE 3 the depressions are relatively deep.

It has been shown, then, that sources of irritation attendant in the use of special weather tires can be eliminated by making its use unobjectionable on the prevalent smooth driving surfaces existing even during an extended winter season. Deep-cleating, the apparent essential to safety under certain driving conditions, can be accomplished without any loss to ease of driving or comfort of driver.

While a full and complete description of the invention has been set forth, it is to be understood that the invention is not intended to be so limited. Accordingly, modifications may be resorted to without departing from the spirit hereof within the scope of the appended claims.

What is claimed is:

1. In a tire, a road contact surface having a tread character, comprising; complemental but unlike protrusions and associated unlike depressions extending between the opposed side walls of said tire and defining a transverse cluster; identical clusters disposed circumferentially adjacent to said first mentioned cluster relating like protrusion to like protrustion; said adjacency of clusters being continuous and endless in spaced circumferential direction; each of said clusters comprising a double Z protrusion having segments reversing the direction of said double Z protrusion; and said double Z protrusion being disposed relative to spaced oval protrusions and a bent U protrusion.

2. The device of claim 1 wherein one said segment of said double Z protrusion is disposed adjacent the closed end of said bent U protrusion with the arms of said bent U protrusion opening toward the side wall of said tire; the opposed side of said segment being in adjacency to one said oval protrusion and the other said segment being in adjacency to the other said oval protrusion.

3. The device of claim 2 wherein a second double Z protrusion is transversely spaced from said first mentioned double Z protrusion; said second mentioned double Z protrusion having segments reversing the direction of said second mentioned double Z protrusion; said second mentioned double Z protrusion disposed relative to said spaced oval protrusions and a second bent U protrusion.

4. The device of claim 3 wherein one said segment of said second mentioned double Z protrusion is disposed adjacent the closed end of said second bent U protrusion with the arms of said second bent U protrusion opening toward the opposed side wall of said tire; the opposed side of said segment being in adjacency to one said oval protrusion and the other said segment being in adjacency to the other said oval protrusion.

5. In a tire, a road contact surface having a tread character, comprising; complemental but unlike protrusions and associated unlike depressions extending between the opposed side walls of said tire and defining a transverse cluster; identical clusters disposed circumferentally adjacent to said first mentioned cluster relating like protrusion to like protrusion; said adjacency of clusters being continuous and endless in spaced circumferential direction; each said cluster comprising a pair of double Z protrusions each having segments reversing the direction of said double Z protrusions with said double Z protrusions being transversely spaced from each other on one side by a pair of oval protrusions and, on the opposed side, being transversely spaced from a pair of bent U protrusions; each said double Z protrusion circumferentally spaced from identical double Z protrusions in said clusters circumferentially spaced from said first mentioned cluster.

References Cited

UNITED STATES PATENTS 175,889   10/1955   Jones _____ D90—20

ARTHUR L. LA POINT, *Primary Examiner.*

Y. P. SCHAEVITZ, C. B. LYON, *Assistant Examiners.*